L. P. THOMPSON.
RESILIENT TIRE.
APPLICATION FILED FEB. 25, 1918.

1,272,576.

Patented July 16, 1918.
2 SHEETS—SHEET 1.

Witnesses
E. C. Wells
H. L. Ripley

Inventor
Lewis P. Thompson
By his Attorneys
Williamson & Merchant

L. P. THOMPSON.
RESILIENT TIRE.
APPLICATION FILED FEB. 25, 1918.
1,272,576.
Patented July 16, 1918.
2 SHEETS—SHEET 2.
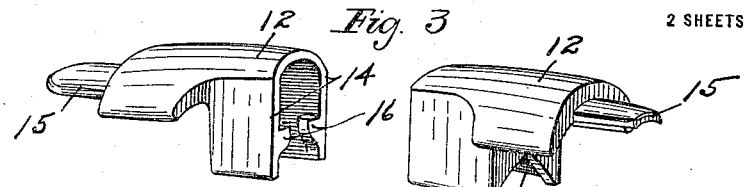
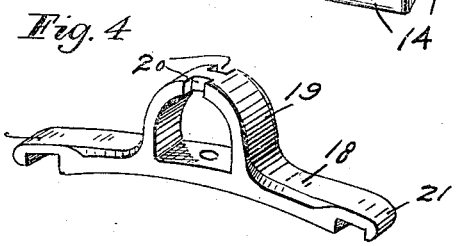
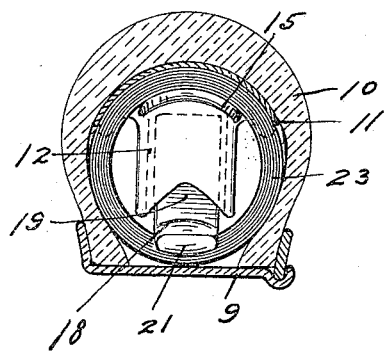
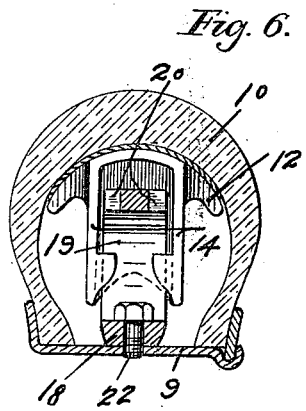
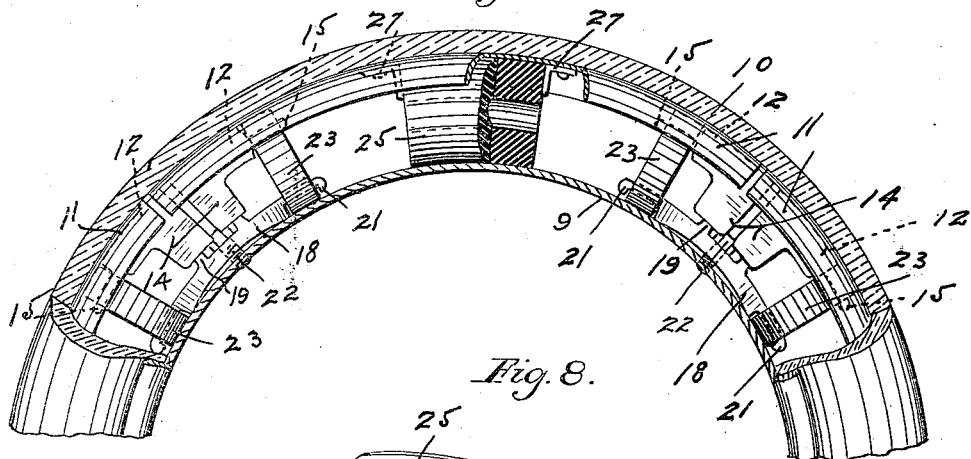
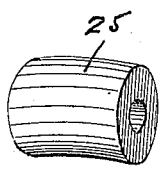
Witnesses
E. C. Wells
H. L. Ripley
Inventor
Lewis P. Thompson
By his Attorneys
Williamson Mereland

UNITED STATES PATENT OFFICE.

LEWIS P. THOMPSON, OF MINNEAPOLIS, MINNESOTA.

RESILIENT TIRE.

1,272,576.

Specification of Letters Patent. 	Patented July 16, 1918.

Application filed February 25, 1918. Serial No. 218,963.

*To all whom it may concern:*

Be it known that I, LEWIS P. THOMPSON, a citizen of the United States, residing at Minneapolis, in the county of Hennepin and State of Minnesota, have invented certain new and useful Improvements in Resilient Tires; and I do hereby declare the following to be a full, clear, and exact description of the invention, such as will enable others skilled in the art to which it appertains to make and use the same.

My invention has for its object to provide an extremely simple and highly efficient resilient tire that has all of the advantages of a pneumatic tire and overcomes the disadvantages thereof by eliminating punctures and blow-outs. This invention permits of the use of commercial forms of wheel rims and casings, and by its use, badly worn and broken-down pneumatic tire casings may be used until entirely worn out, thus greatly reducing tire expense.

To the above end the invention consists of the novel devices and combinations of devices hereinafter described and defined in the claims.

In the accompanying drawings, which illustrate the invention, like characters indicate like parts throughout the several views.

Referring to the drawings:

Fig. 3 is a perspective view of an adjacent pair of presser heads removed from their tread sections;

Fig. 4 is a perspective view of one of the anchor brackets;

Fig. 5 is a transverse section, taken on the line 5—5 of Fig. 1;

Fig. 6 is a transverse section, taken on the line 6—6 of Fig. 1;

Fig. 7 is a fragmentary view corresponding to Fig. 1, with the exception that a different form of yielding fulcrum is employed; and Fig. 8 is a perspective view of the fulcrum shown in Fig. 7.

Figure 1:
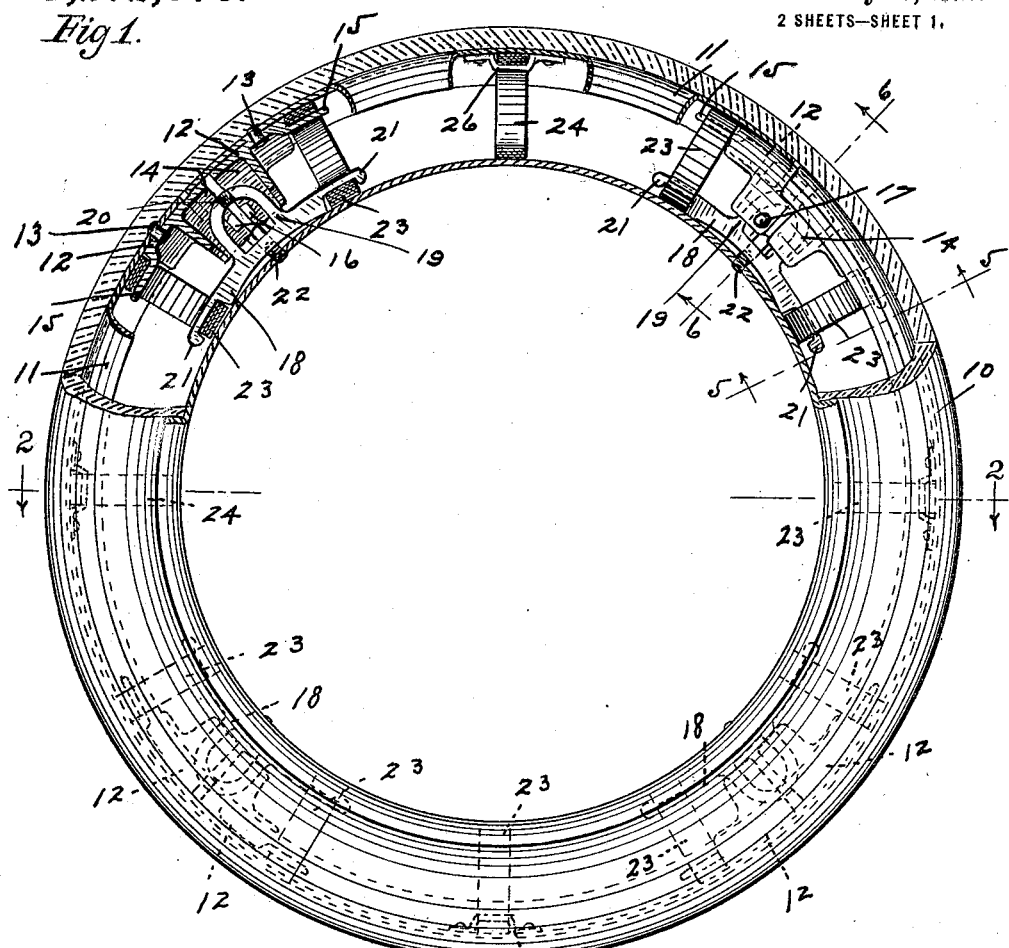
Figure 1 is a view of the invention, partly in side elevation and partly in central circumferential section.
Figure 2:
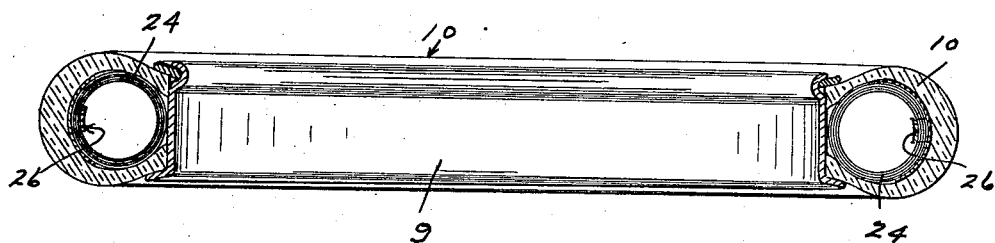
Fig. 2 is a transverse section taken on the line 2—2 of Fig. 1.

The numeral 9 indicates a commercial form of demountable wheel rim, having mounted thereon, a pneumatic tire casing 10, with straight sides. Placed within the casing 10 is a tread member that is transversely curved to fit said casing and comprises, as shown, four segmental sections 11, that are circumferentially spaced to afford gaps between their adjacent ends, whereby said tread member is free to expand and contract under the distortion of the casing. These tread sections 11 are preferably formed from sheet metal and are relatively rigid with cast presser heads 12, located within their ends and rigidly secured thereto by rivets 13. These presser heads 12, may, if desired, be pressed from sheet metal and integrally formed with the tread sections 11.

The outer surfaces of the presser heads 12 are transversely curved to fit within the tread sections 11, and it will be noted that adjacent presser heads are circumferentially spaced to afford therebetween gaps having substantially the same width as the gaps between the tread sections. It is also important to note that one end of each tread section 11 terminates short of the outer end of the connected presser head 12, while the other end thereof projects beyond the outer end of its connected presser head. These projecting ends of the tread sections 11 all extend circumferentially in the same direction and span the gaps between the pairs of presser heads and rest upon the adjacent presser heads within the space left by the ends of the tread sections which terminate short thereof. It will thus be seen that the adjacent ends of tread sections 11 rest upon a single presser head and are thereby held for common radial movement, and, at the same time, present smooth surfaces to the casing.

Each presser head 12 has, on its outer end portion, a pair of inwardly projecting and laterally spaced side flanges 14, and on its inner end is a circumferentially projecting spring retaining finger 15, that is relatively wide and radially spaced inward from the respective tread section 11. On the inner face of each pair of side flanges 14, except one thereof, is a pair of retaining lugs 16, which project toward each other, as shown in Fig. 3. In place of these retaining lugs 16, the other of said pair of side flanges 14, has a retaining nut-equipped bolt 17, passed through alined bores in said pair of side flanges. The purpose of these retaining lugs 16 and retaining bolt 17, will presently appear.

For each adjacent pair of presser heads 12 is a cast anchor bracket 18, having at its intermediate portion an outwardly extended loop 19 that extends between the laterally spaced side flanges 14 of the respective presser heads and holds said heads against lateral movement and in circumferential alinement. In opposite sides of each loop 19, at the outer portion thereof, is a pair of entrance passages 20, for the retaining lugs 16, which, when they enter, the loops 19, as best shown in Fig. 1, interlock the presser heads 12 to the anchor brackets 18 with freedom for limited circumferential and radial movements. The presser head having the retaining bolt 17 is interlocked to the respective anchor bracket 18 by passing said bolt through the loop 19 thereof.

On the circumferentially spaced ends of each anchor bracket 18 is a pair of hook-like spring retaining fingers 21 that are radially spaced outward from the rim 9. The anchor brackets 18 are detachably secured to the rim 9 by short bolts 22, passed from the loops 19 through bores in said anchor brackets and having screw threaded engagement with said rim, as best shown in Fig. 6. By reference to Figs. 1 to 7, it will be noted that the fingers 21 of each anchor bracket 18 are radially alined with the fingers 15 of the coöperating pair of presser heads 12.

Each radially alined pair of fingers 15 and 21 is connected by a laminated spring ring 23. By reference to Fig. 5 it will be noted that the fingers 15 and 21 are inserted through the respective spring ring 23, whereby said spring is firmly held against radial movement between the finger 15 and respective tread section 11 and between the finger 21 and the rim 9. The hook-like fingers 21 hold the spring 23 against circumferential separation from the presser heads and anchor brackets.

Interposed between the intermediate portion of each tread section 11 and the rim 9 is a yielding fulcrum, which, as shown in Fig. 1, is in the form of a laminated spring ring 24, which, like the spring rings 23, also extend transversely of the tire. In Figs. 7 and 8 this yielding fulcrum is in the form of a cylindrical rubber cushion 25, with an axial bore to give the same the required resilience. The yielding fulcrums 24 are secured against circumferential movement in the casing by clips 26, which are riveted to the inner faces of the tread sections 11 on each side of said fulcrums. The yielding fulcrums 25 are held against circumferential movement in the casing 10 by small anchor brackets 27, riveted to the inner facing of the tread sections 11 and engage opposite ends of said fulcrums.

In assembling the parts of the resilient tire the presser head 12 of each pair, to which the tread section having the short end, is secured, is first interlocked to the respective anchor bracket 18 by inserting its retaining lug 16 through the passageways 20 and then moving the same circumferentially away from said anchor bracket to permit the other of said presser heads to be interlocked with the anchor bracket by a like movement. All of the presser heads 12 may be interlocked with the anchor brackets 18 by radial and circumferential movements, with the exception of the last thereof, and this one is interlocked with the respective anchor bracket by only a radial movement to embrace the respective loop 19, and is interlocked therewith by the bolt 17.

Obviously, under the rotation of the tire on a road-bed, the tread sections 11 will be rocked radially under complex movements, and also have the necessary circumferential movement to compensate for the distortion of the tire under the load supported thereby. It is evident that the springs, as they come under the tire, or, in other words, during their nearest approach to the rim, will be compressed and elongated, transversely of the tire. The respective ends of the tread sections 11 will also be pressed toward the rim, thereby rocking said tread sections on the yielding fulcrums and elongating the springs connecting the outer ends of the respective tread sections. Like movements, although at a much less degree, will be imparted to the other tread sections under the action of the presser heads acting upon the supported tread sections.

The laminated springs 23, and also the spring fulcrums 24, are wound like a clock spring, and in case one convolution thereof should break, it will not interfere materially with the action of the spring. In actual usage, a resilient tire, constructed in accordance with the above described invention, has proven highly efficient for the purpose had in view.

What I claim is:

1. The combination with a wheel rim, of a tire casing, a tread member in the casing made up of independent relatively rigid segmental sections, laminated spring rings connecting the ends of the tread sections to the rim and extending transversely thereof, and yielding fulcrums interposed between the intermediate portions of said sections and the rim.

2. The combination with a wheel rim, of a tire casing, a tread member in the casing made up of independent relatively rigid segmental sections having on their ends presser heads, anchor brackets secured to the rim and connecting adjacent presser heads with freedom for limited circumferential and radial movements, springs connecting the presser heads to the anchor brackets, and yielding fulcrums interposed between the intermediate portions of the tread sections and the rim.

3. The combination with a wheel rim, of a tire casing, a tread member in the casing made up of independent relatively rigid segmental sections having presser heads on their ends, one end of each tread section overlapping the presser head of the adjacent tread section, anchor brackets secured to the rim and connecting adjacent presser heads with freedom for limited circumferential and radial movements and holding the same against lateral movement, springs connecting the presser heads to the anchor brackets, and yielding fulcrums interposed between the intermediate portions of the tread sections and the rim.

4. The combination with a wheel rim, of a tire casing, a tread member in the casing made up of relatively rigid independent segmental sections having presser heads on their ends, with inwardly projecting laterally spaced side flanges, one end of each tread section overlapping the presser head of the adjacent tread section, anchor brackets secured to the rim and extending between the laterally spaced side flanges of adjacent presser heads, said presser heads being interlocked with the anchor brackets with freedom for limited circumferential and radial movements, springs connecting the presser heads with the anchor brackets, and yielding fulcrums interposed between the intermediate portions of the tread members and the rim.

5. The combination with a wheel rim, of a tire casing, a tread member in the casing made up of relatively rigid independent segmental sections that are transversely curved to fit said casing, presser heads on the ends of the tread sections, and each thereof having inwardly projecting laterally spaced side flanges and a circumferentially projecting spring retaining finger spaced radially inward from the respective tread sections, the spring retaining fingers on the presser heads of each tread section projecting toward each other, anchor brackets secured to the rim and having outwardly extended looped portions projecting between the laterally spaced side flanges of adjacent presser heads and holding the same against lateral movement, said anchor brackets also having circumferentially extended spring retaining fingers that are radially alined with the spring retaining fingers of the presser heads and spaced radially outward from the rim, means interlocking the side flanges of the presser heads with the looped portions of the anchor brackets to permit limited circumferential and radial movements of the presser heads, laminated spring rings connected to the rim and tread sections by said radially alined pairs of spring retaining fingers, and yielding fulcrums interposed between the intermediate portions of the tread sections and the rim.

In testimony whereof I affix my signature in presence of two witnesses.

LEWIS P. THOMPSON.

Witnesses:
CLARA DEMAREST,
HARRY D. KILGORE.

Copies of this patent may be obtained for five cents each, by addressing the "Commissioner of Patents, Washington, D. C."